UNITED STATES PATENT OFFICE.

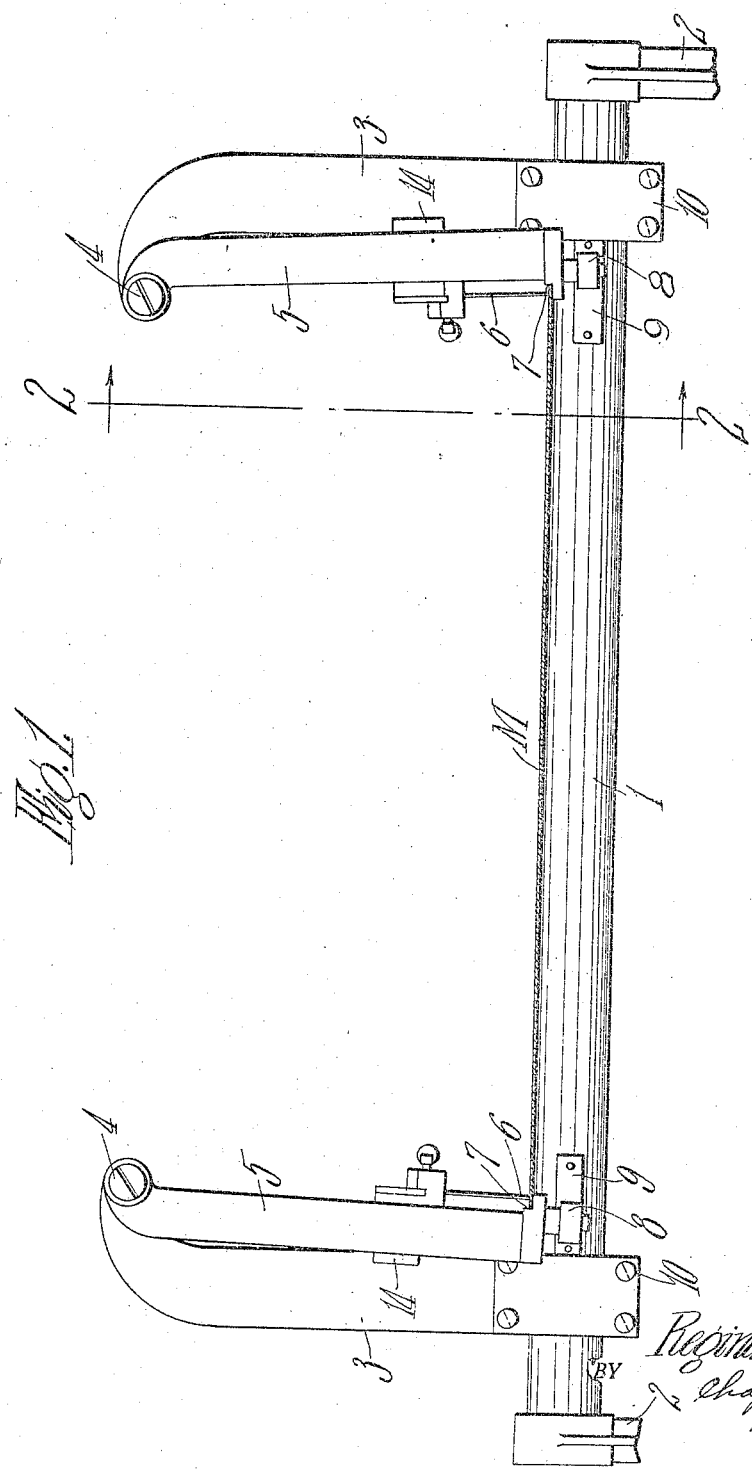

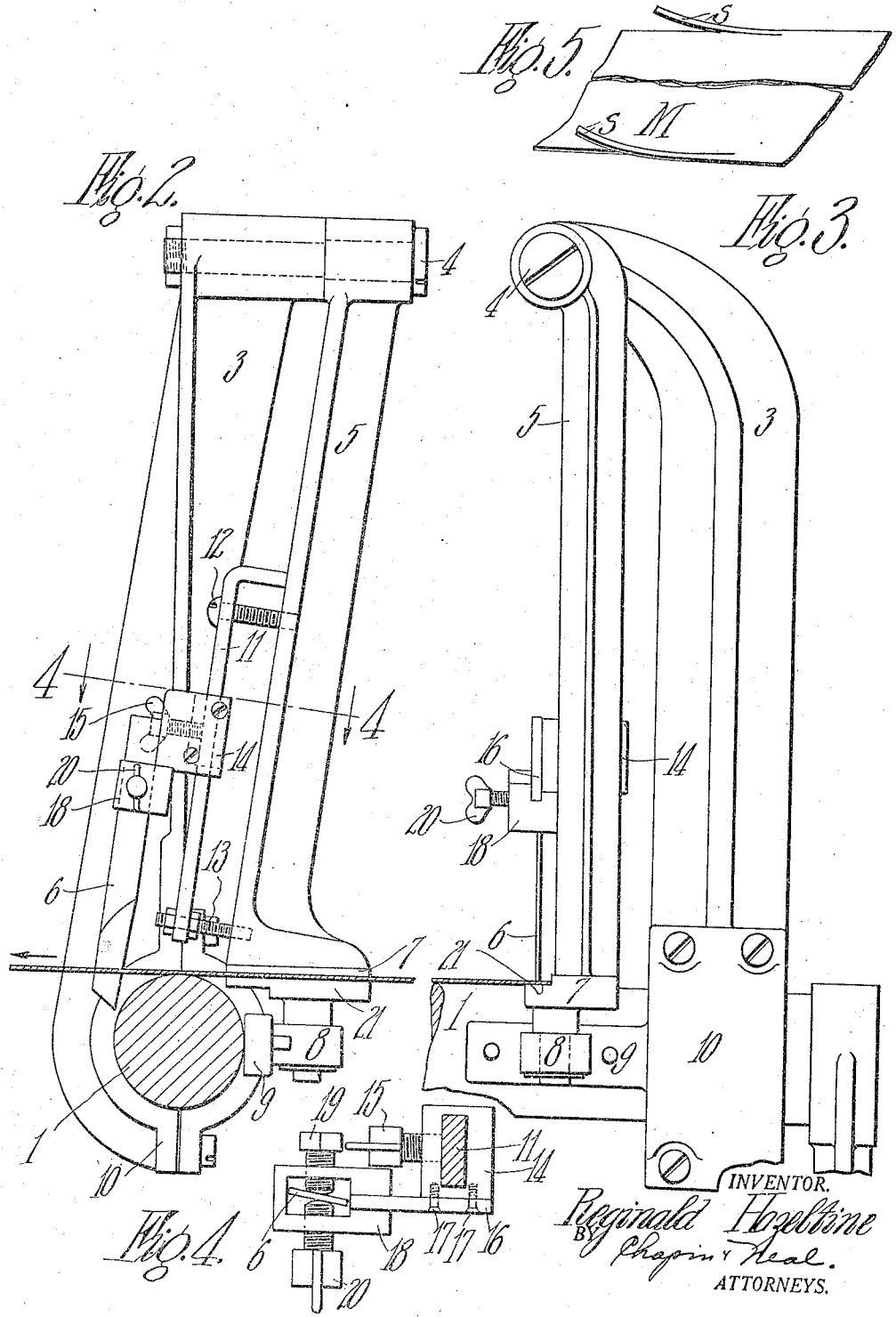

REGINALD HAZELTINE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

TRIMMING-MACHINE.

1,299,335.

Specification of Letters Patent.

Patented Apr. 1, 1919.

Application filed November 5, 1918. Serial No. 261,203.

*To all whom it may concern:*

Be it known that I, REGINALD HAZELTINE, a citizen of the United States of America, residing at Chicopee Falls, in the county of Hampden and State of Massachusetts, have invented certain new and useful Improvements in Trimming-Machines, of which the following is a specification.

My invention relates to cutting machines and more particularly to trimming machines.

In the making of the "fabric" for use in the building of pneumatic tires, woven material is run through calender rolls and rubberized. The calender rolls are generally embodied in a series of separate machines, spaced apart, and each comprising a vertical series of rolls, the fabric being passed from one machine to the next. It is desirable to trim the selvage from the material, and, if a selvage trimmer is to be used, it is highly desirable, for many reasons, to use it upon the material while the material is being calendered, locating the trimmer, say, between two of the calendering machines to act upon the material on the span between the machines.

But the calender machines provide no adequate means for preventing the material from shifting, or playing, back and forth from side to side; so that, if a fixed knife were used to cut the material's edge, the edge would not be cut true, but would be "scalloped" because of the backward and forward side-shift of the material. Now, I have devised a selvage trimmer which accommodates itself to the side-shift of the material and, so is adapted for proper coöperation with the fabric being treated by the calender rolls, cutting the edges of the fabric true and without inequalities.

One object of my invention is to provide an edge trimmer which will cut true the edges of sidewise-shifting traveling material.

Another object is to provide a selvage trimmer which will cut the selvage from fabric traveling between calender machines, truly, accurately, and straight.

To these ends, and also to improve generally upon devices of the character indicated, my invention consists in the following matters hereinafter described and claimed.

In the accompanying drawings—

Figure 1 is an end elevation of a machine embodying my invention, portions of its supports being broken away to economize space, and the material being operated upon being shown in position traveling through the machine (into the paper) and being cut;

Fig. 2 is a view substantially on line 2—2 of Fig. 1 looking in the direction of the arrows, but on a larger scale;

Fig. 3 is a view of the right hand upright shown in Fig. 1, but on a larger scale;

Fig. 4 is a cross-section substantially on the line 4—4 of Fig. 2; and

Fig. 5 is a fragmental perspective view of a portion of material with its selvage partially severed, the central portion of the material being broken out to economize space.

While not restricting my invention thereto, I describe it with more particular reference to the rubberized fabric art and by reference to the illustrated machine. Upon a suitable horizontal support, as the cylindrical bar 1, rigidly supported by the uprights 2, 2, and over which the fabric passes in contact therewith and is spread, are mounted spaced supports 3, 3, extending upward from the bar. Upon each of these supports is pivoted, at 4, a down-hanging blade carrier and actuator 5 for carrying the cutting blade 6 with its cutting edge facing opposite the direction of travel of the material M. Forward of the blade 6, the carrier is provided with a contact-shoulder 7 for contact with the selvage edge of the fabric being cut. Below this shoulder, the carrier has mounted thereon a steadying roller 8 traveling upon a way 9 upon the support 3. As the machine is set up, it is provided that, with the particular sheet being cut, the actuators 5 are inclined sufficiently from the vertical to insure that the shoulders or abutments shall follow the sheet in all sidewise shifts to be encountered, and press against the edge of the sheet at all times.

With this arrangement, as the sheet shifts sidewise back and forth in its travel, the shoulders 7, 7, and hence the blades 6, 6, follow every movement of the sheet and maintain each blade at a constant distance from the edge of the sheet. The result is that a strip of constant width, as *s, s* (Fig. 5), is cut from the sheet for its full length.

It will be understood, of course, that the sheet is fed forward through the machine and against the cutting edges of the blades by any suitable means. Where the machine is used for acting upon a sheet compelled to travel by calender rolls, the rolls perform this feeding. Also it will be understood that the horizontal distance from a shoulder 7 to blade 6 determines the width of strip cut, as the full width of the selvage.

It will be understood, also, that, although in the illustrated machine the swinging blade actuators and carriers are pivoted above the material, the blades are below the pivots, and the actuators incline outward to the edges of the sheet, rather than being pivoted below the material, the blades above the pivots and the actuators inclining inward to the edges of the sheet; I am not confined to the illustrated showing.

Again, it will be understood that, although in the present instance, for convenience in machine design, the means for actuating a blade and the means for carrying that blade are exemplified as combined in an actuator-carrier, as 5, these two means need not necessarily be so combined, as the part 5 performs two distinct functions,—that of carrying the blade and that of actuating it,—and exemplifies two distinct means.

In its details, the illustrated machine comprises the following structure: The shaft 1 may conveniently be the fabric-supporting bar, such as is commonly used between a pair of spaced calender machines for supporting, spreading, and tautening the span of fabric between the machines, and, for certain purposes, such bar may be considered a part,— the base and table,—of the present machine as a whole. But, also, since each group, as parts 3, 5, etc., is adapted for mounting and use upon the supporting bar now in use, it will be seen that each group is in itself a complete mechanism or machine. The uprights 3, 3 are shiftable along the bar 1 to accommodate sheets of different widths and are clamped in adjusted position by the split-collar-and tightening screw construction 10, shown more particularly in Figs. 2 and 3. The parts 5 are conveniently pivoted to the supports 3 by the pivot pins 4, being sleeved upon the pins, as indicated in Fig. 2, and the supports being overhung at the pivot to swing the blade, etc., clear of the support.

Each cutting blade 6 is conveniently carried as follows: (Fig. 2) The member 5 has a bridge piece 11 attached thereto by the screw 12 and adjusting-stem-and-double-nut 13 for adjusting the inclination of the blade 6. A block 14 is slidable upon the bridge 11 and can be fixed in position thereon by the thumb-nut 15 to adjust and fix the vertical position of the blade. An arm 16 is carried by the block 14 and fixed thereto by screws 17. At the end of this arm 16 is a box 18 in which the blade 16 is directly carried, a set-nut 19 and thumb-nut 20 being utilized (Fig. 4) to locate the blade and provide, not only for its angle being changed and adjusted, but also for its adjustment backward and forward to adjust its horizontal distance from the shoulder 7, thereby to adjust the width of the strip cut. Desirably, and as a precaution against the curling of the edge of the material, additional to the bar 1, I provide a ledge 21 resting against the bottom of the edge of the sheet.

It will be seen that I have provided an edge-trimming machine which will cut true the edges of a sidewise-shifting traveling material and which is applicable as a selvage trimmer which will cut the selvage from fabric traveling between calender machines, truly, accurately, and straight.

What I claim is—

1. In an edge trimmer, supporting means adapted for placing adjacent the edge of the material to be trimmed, devices carried by said supporting means for shifting movement with respect thereto, and a blade and an abutment carried by said devices and means for adjusting the distance between said blade and abutment in a line crosswise of the material and for fixing the blade and abutment in adjusted position, said abutment being adapted for contact with the edge of said material, substantially as described.

2. In an edge trimmer for trimming the edge from sidewise-shifting material, in combination, a material receiving device to receive and spread the material horizontally, a supporting means adapted for placing a blade adjacent the edge of said material, a blade, and blade actuating and carrying means movably connected to said support and extending to adjacent said receiving device; the connection between said support and said second-named means being pivotal in character with the pivotal axis, substantially parallel to the edge of the material to provide for the swinging of said means toward such edge in a line crosswise of the material, said blade being carried by such means adjacent said receiving device, such means carrying an abutment adjacent said receiving device for contact with the edge of said material, and said blade being carried in determined relation to said abutment; substantially as described.

3. In an edge trimmer for trimming the edge from sidewise-shifting material, in combination, a horizontal table for receiving the material horizontally spread, a support mounted upon said table, a blade, swinging means for carrying and actuating said blade, and a connection between said means and support; the connection between said means and support being pivotal in character with the pivotal axis substantially parallel to the edge of the material to provide for the swinging of said means toward such edge in a line crosswise of the material, and the blade being carried adjacent said table, said means carrying an abutment adjacent said table for contact with the edge of the material, and the blade being carried in determined relation to said abutment; substantially as described.

4. In an edge trimmer, in combination, a horizontal table member for supporting and spreading the material to be trimmed, a pair of spaced supports adjustably carried by said member to receive the spread material between them, a gravity controlled actuator-carrier pivoted to each said support above said table and carrying an abutment adjacent said member for contact with the adjacent edge of the material, and a cutting blade carried by each said actuator-carrier and spaced from the coöperating abutment the width of the edge-strip desired to be cut, the range of adjustment of said spaced supports adapting them to be located to provide that, with the abutments in contact with the edges of the material, said actuator-carrier shall be swung from the vertical sufficiently to provide that said abutments shall at all times contact the edge of the material in its passage through the trimmer; substantially as described.

5. In an edge trimmer for trimming the edges from sidewise-shifting material, in combination, a base including a bar-supporting means and a horizontal bar carried thereby and adapted to receive the material thereon and serve as a table therefor, a pair of upwardly extending spaced supports adjustably mounted upon said bar to be shifted therealong and receive the material therebetween, a gravity controlled actuator-carrier pivoted at its upper end to each support above said bar to swing to and from its support in the direction of the longitudinal axis of said bar, a blade carried on each actuator-carrier adjacent said bar, each actuator-carrier presenting an abutment for contact with an edge of said material, a blade and its adjacent abutment being at a determined distance apart, and the range of adjustment of the aforesaid supports being sufficient to provide that said supports may be moved sufficiently close together to compel said actuator-carriers to swing from the vertical when said abutments are in contact with the edges of said material; substantially as described.

6. In a device of the character indicated, in combination, a longitudinally extending blade carrier, a blade to be carried thereby, a bridge piece mounted upon said blade carrier and extending therealong, a block adjustably mounted upon said bridge piece for fixing said blade in different positions along said carrier, an arm carried by said block and projecting therefrom, a box carried by said arm and carrying said blade thereon and projecting therefrom along said carrier, and means for adjustably fixing the position of said blade in said box; substantially as described.

7. In a device of the character indicated, in combination, a support provided at one portion of its length with a projecting roller-way, and provided at another portion of its length and on the same side of the support as said roller-way, with a projecting pivot-supporting means, a blade actuator-carrier pivoted to said support and extending substantially parallel with said support and to a position adjacent said roller-way, a blade carried by said actuator-carrier, and a roller carried by said actuator-carrier and playing upon said roller-way, said projecting pivot-supporting means enabling said blade to swing clear of said support and said roller steadying said carrier in its swinging movements; substantially as described.

8. In an edge trimmer for trimming the edge from sidewise shifting material, in combination, supporting means adapted for placing adjacent the edge of the material, a blade, means for carrying said blade, and a connection between said support and said last named means, for carrying such means and blade upon said support; said connection being pivotal in character with the pivotal axis substantially parallel to the edge of the material to provide for the movement of said means toward such edge in a line crosswise of the material; substantially as described.

REGINALD HAZELTINE.

Copies of this patent may be obtained for five cents each, by addressing the "Commissioner of Patents, Washington, D. C."